(12) United States Patent
Omoto et al.

(10) Patent No.: US 11,644,429 B2
(45) Date of Patent: May 9, 2023

(54) LAMINATE STATE CALCULATION METHOD, LAMINATED STATE CALCULATION APPARATUS, AND LAMINATED STATE CALCULATION PROGRAM

(71) Applicant: TOYOTA JIDOSHA KABUSHIKI KAISHA, Toyota (JP)

(72) Inventors: Takuya Omoto, Okazaki (JP); Yuzo Miura, Toyota (JP); Yuichi Nagamatsu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 17/241,536

(22) Filed: Apr. 27, 2021

(65) Prior Publication Data
US 2021/0389259 A1    Dec. 16, 2021

(30) Foreign Application Priority Data
Jun. 15, 2020    (JP) .............................. JP2020-102902

(51) Int. Cl.
*G01N 23/04* (2018.01)
*G01B 15/02* (2006.01)
(52) U.S. Cl.
CPC ............. *G01N 23/04* (2013.01); *G01B 15/02* (2013.01)
(58) Field of Classification Search
CPC ...... G01N 23/04; G01B 15/02; G06T 7/0004; G06T 2207/10116; G06T 2207/20056
See application file for complete search history.

(56) References Cited

U.S. PATENT DOCUMENTS 5,674,590 A * 10/1997 Anderson .............. D21H 15/06
162/111
5,770,313 A * 6/1998 Furumoto ............... B32B 27/34
428/435

(Continued)

FOREIGN PATENT DOCUMENTS

| JP | 2007-187545 A | 7/2007 |
| JP | 2008-122178 A | 5/2008 |
| WO | 2020/090488 A1 | 5/2020 |

OTHER PUBLICATIONS

Schumacher et al., Defect recognition in CFRP components using various NDT methods within a smart manufacturing process, AIP Conference Proceedings 1949, 020024 (2018); (Year: 2018).*

*Primary Examiner* — David P Porta
*Assistant Examiner* — Djura Malevic
(74) *Attorney, Agent, or Firm* — Oliff PLC

(57) ABSTRACT

A method for calculating a laminate state of a CFRP laminate according to an embodiment includes acquiring a plurality of images of a cross section of the CFRP laminate orthogonal to a lamination direction by imaging the CFRP laminate with X-rays at a plurality of different positions in the lamination direction, the CFRP laminate including first layers including carbon fibers oriented in a first direction orthogonal to the lamination direction and second layers including carbon fibers oriented in a second direction orthogonal to the lamination direction and different from the first direction, and calculating a parameter correlated with a quantity of voids formed in the first layers and the second layers from the plurality of acquired images, and distinguishing between the first layers and the second layers using the calculated parameter.

6 Claims, 12 Drawing Sheets

(56) References Cited

U.S. PATENT DOCUMENTS

| | | | | |
|---|---|---|---|---|
| 6,277,771 | B1* | 8/2001 | Nishimura | D03D 15/573 |
| | | | | 442/256 |
| 8,071,205 | B2* | 12/2011 | Tsuchiya | C08J 5/247 |
| | | | | 428/297.4 |
| 9,664,624 | B2* | 5/2017 | Sasamoto | G06T 7/0004 |
| 9,887,323 | B2* | 2/2018 | Nagamatsu | H01L 33/405 |
| 9,916,651 | B2* | 3/2018 | Morard | G06T 7/41 |
| 10,343,352 | B2* | 7/2019 | Iwata | B29B 15/122 |
| 11,442,044 | B2* | 9/2022 | Jack | G01N 29/11 |
| 11,442,045 | B2* | 9/2022 | Jack | G01N 29/341 |
| 2007/0223802 | A1* | 9/2007 | Tateda | B29C 70/54 |
| | | | | 382/141 |
| 2011/0143110 | A1* | 6/2011 | Tsuchiya | B29C 70/08 |
| | | | | 264/258 |
| 2011/0217584 | A1* | 9/2011 | Terakawa | B32B 27/08 |
| | | | | 429/144 |
| 2013/0194568 | A1* | 8/2013 | Hatsu | G01N 21/8851 |
| | | | | 356/237.3 |
| 2013/0295806 | A1* | 11/2013 | Imai | B29B 15/14 |
| | | | | 428/389 |
| 2014/0155540 | A1* | 6/2014 | Imai | B29C 70/003 |
| | | | | 524/592 |
| 2014/0288893 | A1* | 9/2014 | Blom | G06F 30/23 |
| | | | | 703/1 |
| 2014/0356612 | A1* | 12/2014 | Sano | C08L 51/06 |
| | | | | 428/300.1 |
| 2015/0135517 | A1* | 5/2015 | Doi | H02J 7/005 |
| | | | | 324/427 |
| 2015/0212008 | A1* | 7/2015 | Sasamoto | G01N 21/8806 |
| | | | | 348/86 |
| 2015/0349209 | A1* | 12/2015 | Nagamatsu | H01L 33/405 |
| | | | | 257/98 |
| 2015/0377839 | A1* | 12/2015 | Jack | G01N 29/11 |
| | | | | 702/33 |
| 2016/0203594 | A1* | 7/2016 | Morard | G06V 10/40 |
| | | | | 382/152 |
| 2017/0074829 | A1* | 3/2017 | Mertins | B32B 5/26 |
| 2018/0044489 | A1* | 2/2018 | Takehara | B29C 70/42 |
| 2018/0106908 | A1* | 4/2018 | Matsusaka | G01T 1/10 |
| 2018/0222128 | A1* | 8/2018 | Tomioka | B29B 15/08 |
| 2018/0244879 | A1* | 8/2018 | Takehara | B29C 70/465 |
| 2019/0128819 | A1* | 5/2019 | Zeppenfeld | G06T 7/0004 |
| 2020/0121273 | A1* | 4/2020 | Bogumil | A61B 6/54 |
| 2020/0285997 | A1* | 9/2020 | Bhattacharyya | G06N 7/00 |
| 2020/0291198 | A1* | 9/2020 | Oda | C08J 5/243 |
| 2020/0309967 | A1* | 10/2020 | Kondo | A61B 6/44 |
| 2021/0003515 | A1* | 1/2021 | Ushikura | G01T 1/2018 |
| 2021/0388165 | A1 | 12/2021 | Fuse | |
| 2021/0389259 | A1* | 12/2021 | Omoto | G01B 15/02 |

\* cited by examiner

LAMINATE STATE CALCULATION METHOD, LAMINATED STATE CALCULATION APPARATUS, AND LAMINATED STATE CALCULATION PROGRAM

CROSS REFERENCE TO RELATED APPLICATIONS

This application is based upon and claims the benefit of priority from Japanese patent application No. 2020-102902, filed on Jun. 15, 2020, the disclosure of which is incorporated herein in its entirety by reference.

BACKGROUND

The present disclosure relates to a laminate state calculation method, a laminate state calculation apparatus, and a laminate state calculation program. The present disclosure relates to, for example, a laminate state calculation method, a laminate state calculation apparatus, and a laminate state calculation program for a carbon fiber reinforced plastic laminate.

Japanese Unexamined Patent Application Publication No. 2008-122178 discloses a method for detecting a laminate state by calculating a power spectrum using a CT image and obtaining a lamination angle of a fiber sheet from the power spectrum in order to detect a laminate status of a laminate.

Japanese Unexamined Patent Application Publication No. 2007-187545 discloses a method for determining an orientation direction of fibers in a fiber reinforced plastic used in a hydrogen tank by detecting a trajectory of a bright part using a reflection characteristic of light to determine the orientation direction of the fibers.

SUMMARY

Since the detection method of Japanese Unexamined Patent Application Publication No. 2008-122178 requires CT imaging with a resolution high enough to confirm the orientation of fibers, it is difficult to detect the laminate state over a wide range. In the determination method of Japanese Unexamined Patent Application Publication No. 2007-187545, only the orientation direction of the fibers on an outermost layer of the hydrogen tank can be determined, and it is difficult to determine the orientation of fibers inside the hydrogen tank.

The present disclosure has been made to solve such a problem and provides a laminate state calculation method, a laminate state calculation apparatus, and a laminate state calculation program which can easily determine a laminate state of a laminate including a plurality of laminated layers having different orientations of fibers in a carbon fiber reinforced plastic or the like.

An example aspect is a method for calculating a laminate state of a carbon fiber reinforced plastic laminate. The method includes: acquiring a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated; and calculating a parameter correlated with a quantity of voids formed in the first layers and the second layers from the plurality of acquired images, and distinguishing between the first layers and the second layers using the calculated parameter. With such a configuration, it is possible to easily determine a laminate state of a CFRP laminate 10.

The above method may further include removing an influence of second voids from an area including first voids in the plurality of acquired images when the voids extending in the first direction are defined as being the first voids and the voids extending in the second direction are defined as being the second voids. With such a configuration, it is possible to improve the accuracy of the determination of the laminate state.

In the above method, the removing of the influence of the second voids may include: converting the image into a power spectrum by Fast Fourier Transform; removing a spectrum of the second voids from the converted power spectrum; and converting the power spectrum from which the spectrum of the second voids is removed into the image by Inverse Fast Fourier Transform. With such a configuration, it is possible to further improve the accuracy of the determination of the laminate state.

In the above method, the parameter may be a standard deviation of luminance of an area including the first voids in the plurality of images. With such a configuration, it is possible to improve the accuracy of the determination of the laminate state.

In the above method, the parameter may be an amount of change in a standard deviation of luminance of an area including the first voids in the plurality of images. With such a configuration, it is possible to improve the accuracy of the determination of the laminate state.

In the above method, the laminate may have a cylindrical shape including a central axis, and the lamination direction may be a direction orthogonal to the central axis. With such a configuration, it is possible to improve the accuracy of the determination of the laminate state.

In the above method, the second direction may be a direction of rotation about the central axis, and the first direction may be a direction inclined in the second direction. With such a configuration, it is possible to improve the accuracy of the determination of the laminate state.

Another example aspect is a laminate state calculation apparatus for a carbon fiber reinforced plastic laminate including: an imaging unit configured to acquire a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated; and an image processing unit configured to calculate a parameter correlated with a quantity of voids formed in the first layers and the second layers from the plurality of acquired images, and distinguish between the first layers and the second layers using the calculated parameter. With such a configuration, it is possible to easily determine a laminate state of the CFRP laminate 10.

In the above laminate state calculation apparatus, the image processing unit may be configured to remove an influence of second voids from an area including first voids in the plurality of acquired images when the voids extending in the first direction are defined as being the first voids and the voids extending in the second direction are defined as being the second voids. With such a configuration, it is possible to improve the accuracy of the determination of the laminate state.

In the above laminate state calculation apparatus, the image processing unit may be configured to: when the image processing unit removes the influence of the second voids, convert the image into a power spectrum by Fast Fourier Transform, remove a spectrum of the second voids from the converted power spectrum, and convert the power spectrum from which the spectrum of the second voids is removed into the image by Inverse Fast Fourier Transform. With such a configuration, it is possible to further improve the accuracy of the determination of the laminate state.

In the above laminate state calculation apparatus, the parameter may be a standard deviation of luminance of an area including the first voids in the plurality of images. With such a configuration, it is possible to improve the accuracy of the determination of the laminate state.

In the above laminate state calculation apparatus, the parameter may be an amount of change in a standard deviation of luminance of an area including the first voids in the plurality of images. With such a configuration, it is possible to improve the accuracy of the determination of the laminate state.

In the above laminate state calculation apparatus, the laminate may have a cylindrical shape including a central axis, and the lamination direction may be a direction orthogonal to the central axis. With such a configuration, it is possible to improve the accuracy of the determination of the laminate state.

In the above laminate state calculation apparatus, the second direction may be a direction of rotation about the central axis, and the first direction may be a direction inclined in the second direction. With such a configuration, it is possible to improve the accuracy of the determination of the laminate state.

Another example aspect is a laminate state calculation program for a carbon fiber reinforced plastic laminate causing a computer to execute: acquiring a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated; and calculating a parameter correlated with a quantity of voids formed in the first layers and the second layers from the plurality of acquired images, and distinguishing between the first layers and the second layers using the calculated parameter. With such a configuration, it is possible to easily determine a laminate state of the CFRP laminate 10.

The above laminate state calculation program may further cause the computer to execute removing an influence of second voids from an area including first voids in the plurality of acquired images when the voids extending in the first direction are defined as being the first voids and the voids extending in the second direction are defined as being the second voids. With such a configuration, it is possible to improve the accuracy of the determination of the laminate state.

In the above laminate state calculation program, when the computer is caused to remove the influence of the second voids, the computer may be further caused to execute: converting the image into a power spectrum by Fast Fourier Transform; removing a spectrum of the second voids from the converted power spectrum; and converting the power spectrum from which the spectrum of the second voids is removed into the image by Inverse Fast Fourier Transform. With such a configuration, it is possible to further improve the accuracy of the determination of the laminate state.

In the above laminate state calculation program, the parameter may be a standard deviation of luminance of an area including the first voids in the plurality of images. With such a configuration, it is possible to further improve the accuracy of the determination of the laminate state.

In the above laminate state calculation program, the parameter may be an amount of change in a standard deviation of luminance of an area including the first voids in the plurality of images. With such a configuration, it is possible to improve the accuracy of the determination of the laminate state.

In the above laminate state calculation program, the laminate may have a cylindrical shape including a central axis, and the lamination direction may be a direction orthogonal to the central axis. With such a configuration, it is possible to improve the accuracy of the determination of the laminate state.

According to the embodiments, it is possible to provide a laminate state calculation method, a laminate state calculation apparatus, and a laminate state calculation program which can easily determine a laminate state.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
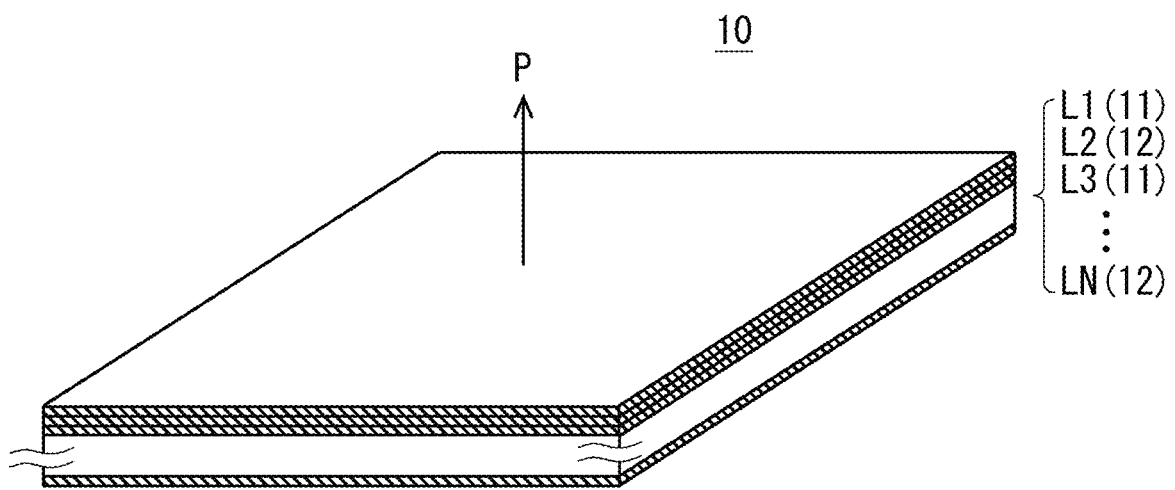
FIG. 1 is a cross-sectional perspective view showing an example of a CFRP laminate according to an embodiment.

Hereinafter, the present disclosure will be described through embodiments of the disclosure, but the disclosure according to the claims is not limited to the following embodiments. Further, not all of the components described in the embodiments are essential as means for solving the problem. For clarity of explanation, the following description and drawings have been omitted and simplified as appropriate. In the drawings, the same elements are denoted by the same reference signs, and repeated descriptions are omitted as necessary.

Embodiment

A laminate state calculation method according to an embodiment will be described. First, a subject laminate will be described. Next, a laminate state calculation apparatus for calculating a laminate state of the laminate will be described. After that, the laminate state calculation method will be described.

Laminate

A laminate whose laminate state is calculated by the laminate state calculation method according to this embodiment is, for example, a Fiber Reinforced Plastics (hereafter referred to as FRP) laminate such as a Carbon Fiber Reinforced Plastics (hereinafter referred to as CFRP) laminate. Hereinafter, the CFRP laminate will be described as an example of the FRP laminate. The CFRP laminate includes a plurality of laminated layers. Each layer includes a plurality of carbon fibers oriented in a predetermined direction.

Figure 2:
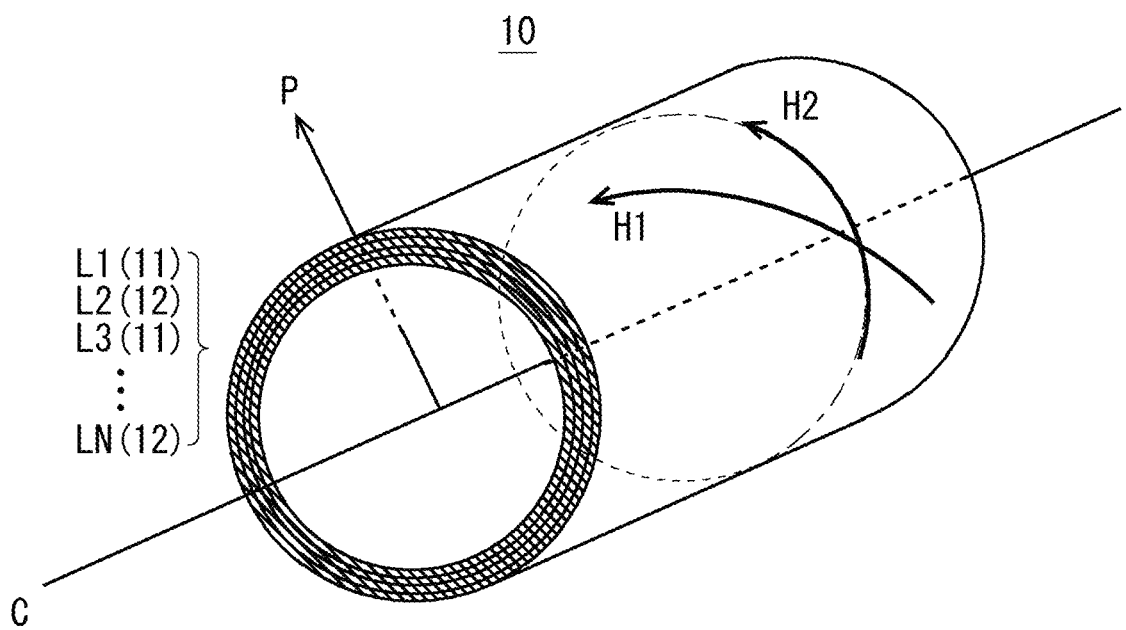
FIG. 2 is a cross-sectional perspective view showing an example of a CFRP laminate according to the embodiment.

FIGS. 1 and 2 are cross-sectional perspective views showing an example of the CFRP laminate according to the embodiment. As shown in FIG. 1, a CFRP laminate 10 may be in the form of a sheet. As shown in FIG. 2, the CFRP laminate 10 may have a cylindrical shape including a central axis C. In the case of the sheet-like CFRP laminate 10, a lamination direction P is orthogonal to a sheet surface. On the other hand, in the case of the cylindrical CFRP laminate 10, the lamination direction P is orthogonal to the central axis C of the cylinder. The orientation direction of the fibers included in each layer of the CFRP laminate 10 is, for example, the predetermined direction orthogonal to the lamination direction.

An FRP laminate such as the CFRP laminate 10 is used for various constituent members such as constituent members of an automobile and an aircraft. For example, the CFRP laminate 10 may be used for a hydrogen tank of a fuel cell vehicle. The CFRP laminate 10 may be used not only for the hydrogen tank but also for other constituent members.

In the CFRP laminate 10 subject to be processed by the laminate state calculation method according to this embodiment, the orientation direction of each layer is different from the orientation direction of the upper and lower layers. For example, when the CFRP laminate 10 includes layers L1, L2, L3, and . . . , and LN, the orientation direction of the layer L2 is different from the orientation directions of the layers L1 and L3. For example, in the CFRP laminate 10, first layers 11 and second layers 12 are alternatively laminated. In the first layer 11, carbon fibers are oriented in a first direction orthogonal to the lamination direction P, whereas in the second layer 12, carbon fibers are oriented in a second direction that is orthogonal to the lamination direction P and is different from the first direction.

As shown in FIG. 2, in the case of the cylindrical CFRP laminate 10, the direction orthogonal to the central axis C and the lamination direction P, namely, the direction of rotation about the central axis C, is referred to as a hoop direction H2 in this specification for convenience. The direction orthogonal to the lamination direction P and inclined in the hoop direction H2 is referred to as A helical direction H1 in this specification for convenience. In this case, for example, the first direction is the helical direction H1, and the second direction is the hoop direction H2. Thus, in the CFRP laminate 10, the helically wound first layers 11 oriented in the helical direction H1 and the hoop wound second layers 12 oriented in the hoop direction H2 are alternately laminated.

Laminate State Calculation Apparatus

Figure 3:
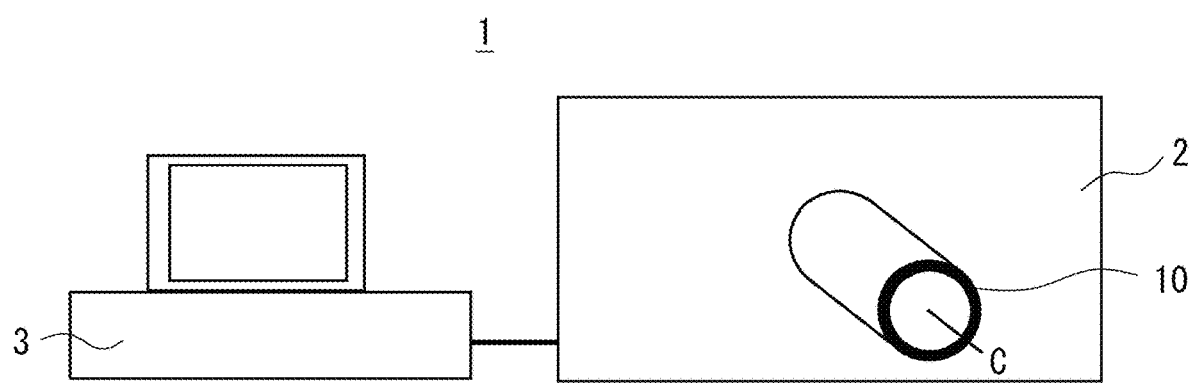
FIG. 3 is a configuration diagram showing an example of a laminate state calculation apparatus according to the embodiment.

Next, a laminate state calculation apparatus according to this embodiment will be described. FIG. 3 is a configuration diagram showing an example of the laminate state calculation apparatus according to the embodiment. As shown in FIG. 3, the laminate state calculation apparatus 1 includes an imaging unit 2 and an image processing unit 3. The imaging unit 2 is, for example, an X-ray CT scanning apparatus. The laminate state calculation apparatus 1 acquires a plurality of images of a cross section by the imaging unit 2 imaging the CFRP laminate 10 with X-rays. The laminate state calculation apparatus 1 uses the image processing unit 3 to determine a laminate state of each layer of the CFRP laminate 10 from the plurality of acquired images of the cross section. Hereinafter, an operation of the laminate state calculation apparatus 1 will be described in detail with reference to the drawings.

FIGS. 4 to 7 show an example of an imaging method performed by the imaging unit 2 in the laminate state calculation apparatus 1 according to the embodiment. FIG. 8 is a schematic diagram showing an example of the image of the cross section taken by the imaging unit 2 in the laminate state calculation apparatus 1 according to the embodiment.

Figure 4:
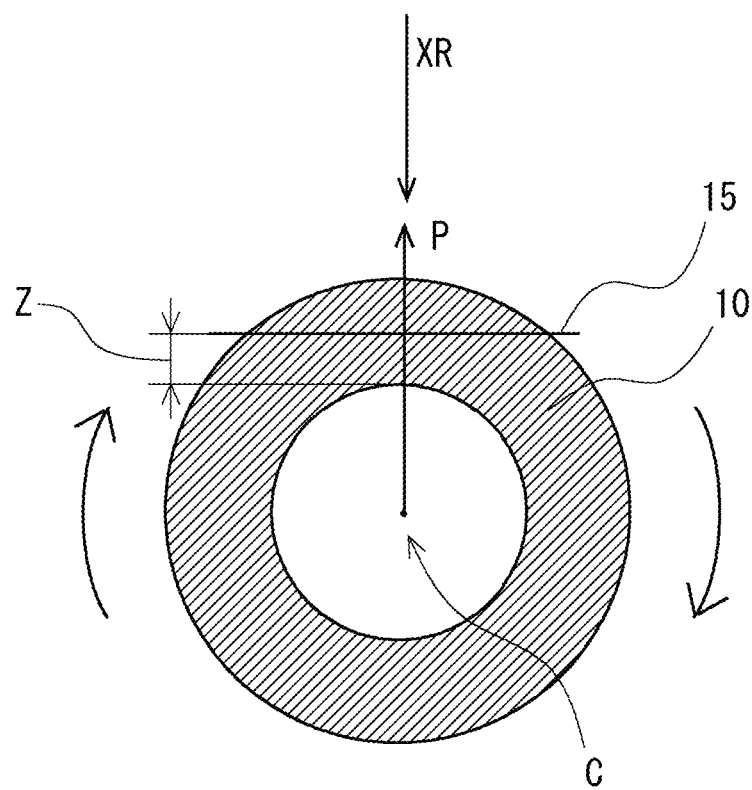
FIG. 4 shows an example of an imaging method of an imaging unit in the laminate state calculation apparatus according to the embodiment.
Figure 5:
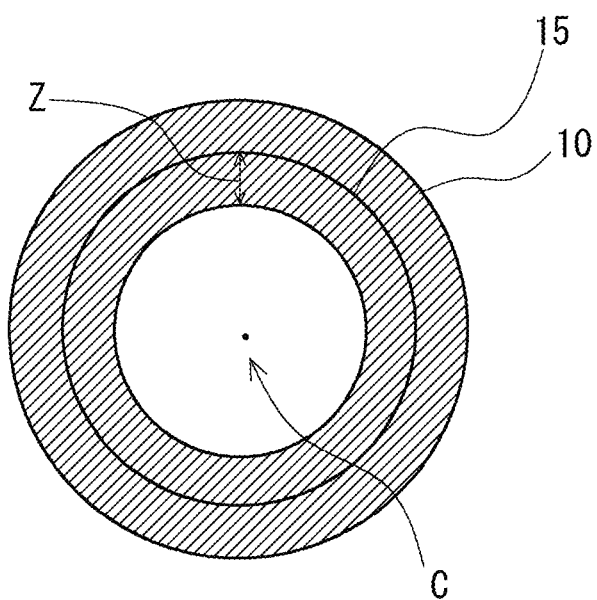
FIG. 5 shows an example of the imaging method of the imaging unit in the laminate state calculation apparatus according to the embodiment.

As shown in FIG. 4, the imaging unit 2 applies an X-ray XR from the lamination direction P of the CFRP laminate 10. Thus, the imaging unit 2 images a cross section 15 orthogonal to the lamination direction P at a predetermined depth Z of the CFRP laminate 10. Then, by rotating the CFRP laminate 10 around the central axis C, as shown in FIG. 5, images of the cross section 15 of the CFRP laminate 10 at the constant depth Z are acquired for 360 [deg].

Figure 6:
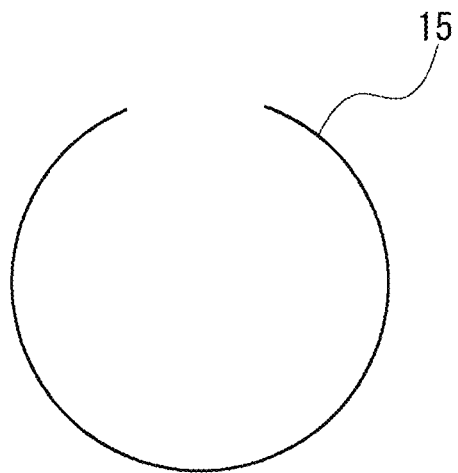
FIG. 6 shows an example of the imaging method of the imaging unit in the laminate state calculation apparatus according to the embodiment.
Figure 7:
FIG. 7 shows an example of the imaging method of the imaging unit in the laminate state calculation apparatus according to the embodiment.
Figure 8:
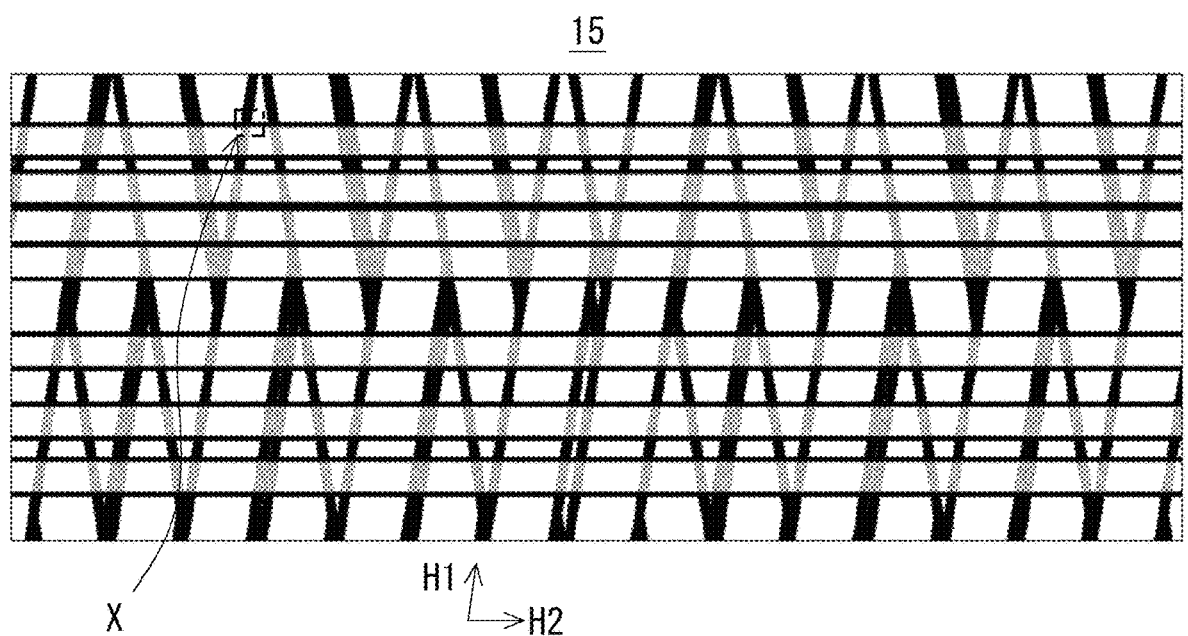
FIG. 8 is a schematic diagram showing an example of an image of a cross section taken by the imaging unit in the laminate state calculation apparatus according to the embodiment.

Next, as shown in FIG. 6, the imaging unit 2 expands the images of the cross section 15, and as shown in FIG. 7, acquires a planar image of the cross section 15. In this manner, as shown in FIG. 8, the imaging unit 2 acquires the image of the cross section 15 of the CFRP laminate 10. In the image of the cross section 15 acquired by the imaging unit 2, a pattern caused by the voids is imaged. In the image of the cross section 15, for example, a pattern extending in the helical direction H1 and a pattern extending in the hoop direction H2 are imaged.

The pattern extending in the helical direction H1 is a pattern caused by the voids formed by orienting the carbon fibers in the helical direction H1. That is, the pattern extending in the helical direction H1 is formed by the voids extending in the helical direction. On the other hand, the pattern extending in the hoop direction H2 is a pattern caused by the voids formed by orienting the carbon fibers in the hoop direction H2. That is, the pattern extending in the hoop direction H2 is formed by the voids extending in the hoop direction.

If the acquired image of the cross section 15 is, for example, the helically wound first layer 11, the pattern caused by the voids is originally the only pattern caused by the voids extending in the helical direction H1. However, the voids extending in the hoop direction H2 may be formed in the first layer 11 during the manufacturing process of the CFRP laminate 10. As a result, the pattern caused by the voids extending in the hoop direction H2 is also formed in the first layer 11.

The imaging unit 2 repeats the operations shown in FIGS. 4 to 7 at a plurality of different positions (depths) in the lamination direction P. As described above, the imaging unit 2 images the CFRP laminate 10 at a plurality of different positions in the lamination direction P using X-rays, thereby acquiring a plurality of images of the cross section 15 orthogonal to the lamination direction P.

The image processing unit 3 processes the plurality of images of the cross section 15 acquired by the imaging unit 2. Thus, the image processing unit 3 may be composed of hardware including, for example, a Central Processing Unit (CPU), a Read Only Memory (ROM), a Random Access Memory (RAM), an interface unit (I/F), etc. The CPU processes the input images of the cross section 15 and the like. The ROM stores a laminate state calculation program, a control program, and the like executed by the CPU. The RAM stores the images of the cross section 15 and so on. The interface unit (I/F) inputs and outputs data and the like to other devices such as the imaging unit 2, a display device, and an external storage device. The CPU, the ROM, the RAM, and the interface unit are connected to each other via a data bus or the like.

The image processing unit 3 obtains the quantity of the voids formed in the first layers 11 and the second layers 12 from the acquired the plurality of images of the cross section 15. Thus, the image processing unit 3 calculates a parameter correlated with the quantity of the voids. The parameter is, for example, a standard deviation $\sigma$ and an amount of change $\Delta\sigma$ in the standard deviation $\sigma$. Then, the image processing unit 3 distinguishes between the first layers 11 and the second layer 12 using the calculated parameter. In the following description of the laminate state calculation method, the operations of the imaging unit 2 and the image processing unit 3 will be described in detail.

Laminate State Calculation Method

Figure 9:
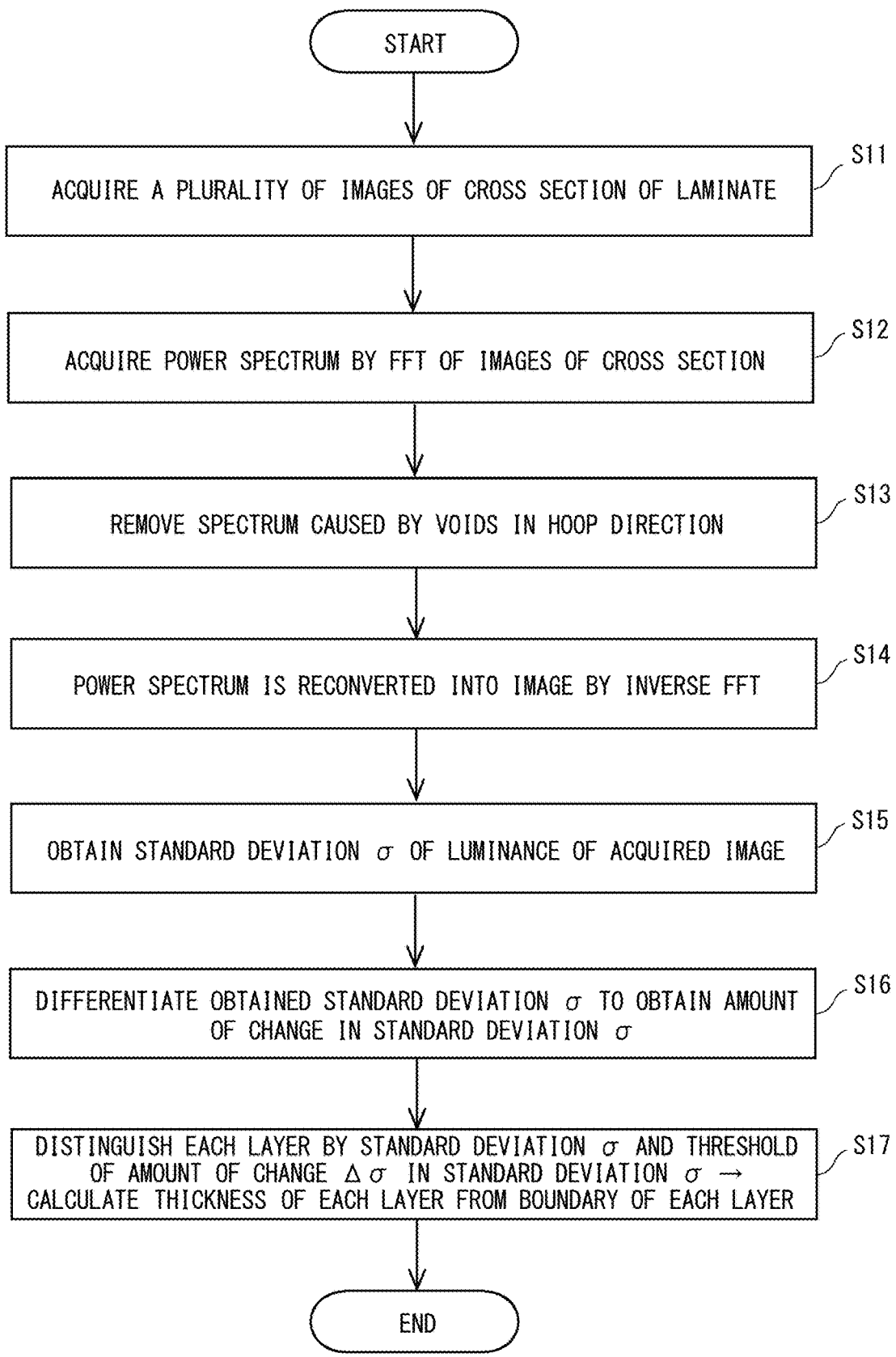
FIG. 9 is a flowchart showing an example of a laminate state calculation method according to the embodiment.

Next, the laminate state calculation method according to the embodiment will be described. FIG. 9 is a flowchart showing an example of the laminate state calculation method according to the embodiment.

As shown in Step S11 of FIG. 9, the plurality of images of the cross section 15 of the CFRP laminate 10 are acquired. Specifically, the imaging unit 2 images the CFRP laminate 10 at a plurality of different positions in the lamination direction P using X-rays, thereby acquiring a plurality of images of the cross section 15 orthogonal to the lamination direction P.

Figure 10:
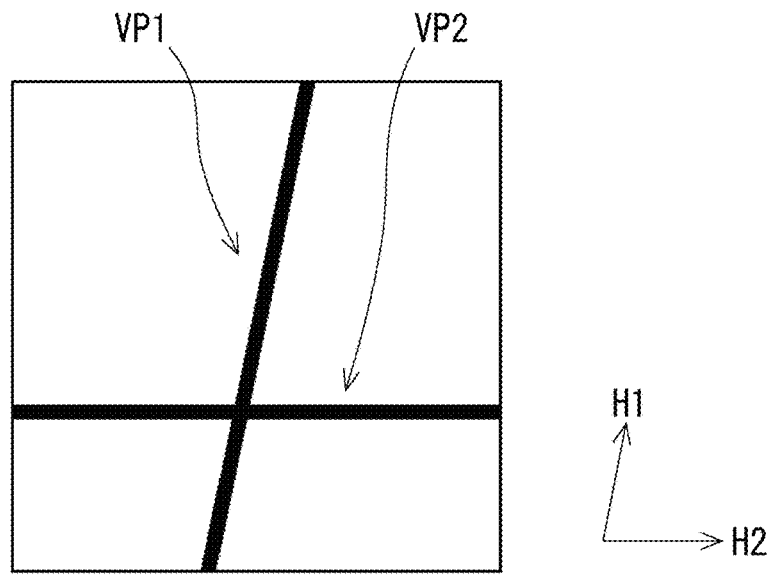
FIG. 10 is a schematic diagram showing an image of an area including voids used in the laminate state calculation method according to the embodiment, and shows an area indicated by X in FIG. 8.

FIG. 10 is a schematic diagram showing an image of an area including voids used in the laminate state calculation method according to the embodiment, and shows an area indicated by X in FIG. 8. As shown in FIG. 10, the image processing unit 3 uses the area including the pattern caused by the voids in the image of the cross section 15 for processing. The area including the pattern caused by the voids includes a pattern VP1 caused by the void extending in the helical direction H1 and a pattern VP2 caused by the void extending in the hoop direction H2.

The image processing unit 3 may remove the influence of the voids extending in the hoop direction H2 from the area including the voids extending in the helical direction H1 in the plurality of acquired images of the cross section 15. The following Steps S12 to S14 are for removing the influence of the voids extending in the hoop direction H2 in the plurality of acquired images.

Figure 11:
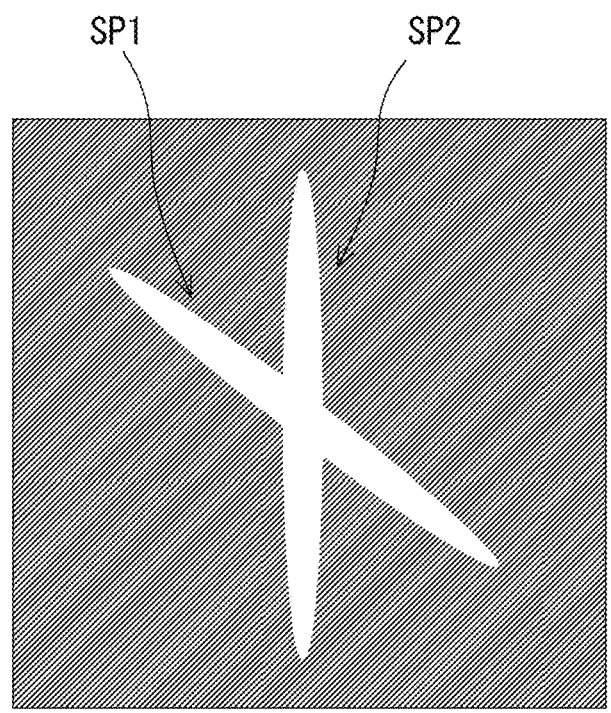
FIG. 11 is a schematic diagram showing an example of power spectra in the laminate state calculation method according to the embodiment.

As shown in Step S12 of FIG. 9, the power spectrum is acquired by Fast Fourier Transform (hereinafter referred to as FFT) of the images of the cross section 15. FIG. 11 is a schematic diagram showing an example of the power spectra in the laminate state calculation method according to the embodiment. As shown in FIG. 11, the image processing unit 3 converts the image of the cross section 15 into a power spectrum by FFT. Thus, power spectra at spatial frequencies u and v are acquired. The acquired power spectra includes a spectrum SP1 caused by the voids in the helical direction H1 and a spectrum SP2 caused by the voids in the hoop direction H2.

Figure 12:
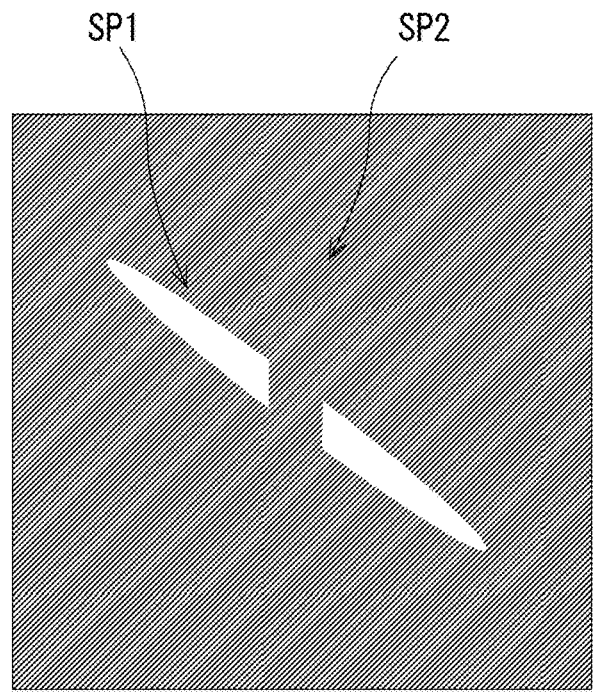
FIG. 12 is a schematic diagram showing an example of power spectra from which a spectrum formed by the voids in a hoop direction is removed by the laminate state calculation method according to the embodiment.

Next, as shown in Step S13 of FIG. 9, the spectrum SP2 is masked in order to remove the spectrum SP2 caused by the voids in the hoop direction H2. FIG. 12 is a schematic diagram showing an example of the power spectrum obtained by removing the spectrum SP2 caused by the voids in the hoop direction H2 by the laminate state calculation method according to the embodiment. As shown in FIG. 12, the image processing unit 3 removes the spectrum SP2 in the converted power spectrum.

Figure 13:
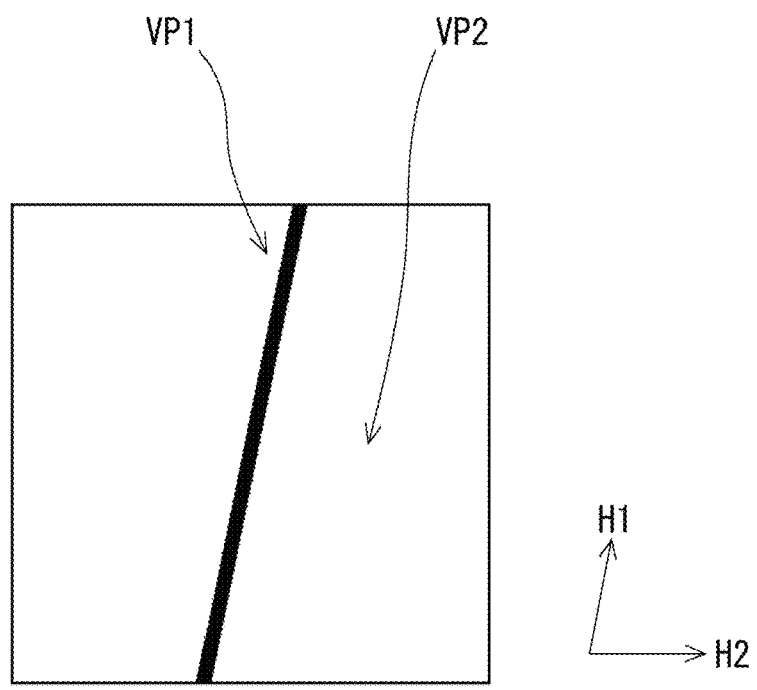
FIG. 13 is a schematic diagram showing an example of a reconverted image in the laminate state calculation method according to the embodiment.

Next, as shown in Step S14 of FIG. 9, the power spectrum is reconverted into an image by inverse FFT. FIG. 13 is a schematic diagram showing an example of the reconverted image by the laminate state calculation method according to the embodiment. As shown in FIG. 13, the image processing unit 3 converts the power spectrum from which the spectrum SP2 has been removed into an image by the inverse FTT. The pattern VP2 extending in the hoop direction H2 is removed from the reconverted image.

The image processing unit 3 acquires the image obtained by performing FFT processing, masking processing, and inverse FFT processing on the plurality of images of the cross section taken at the plurality of different positions in the lamination direction.

Next, as shown in Step S15 of FIG. 9, the standard deviation $\sigma$ of the luminance of the acquired image is obtained. Specifically, the image processing unit 3 calculates the standard deviation σ of the luminance from luminance of the area including the pattern of the voids of each image.

Figure 14:
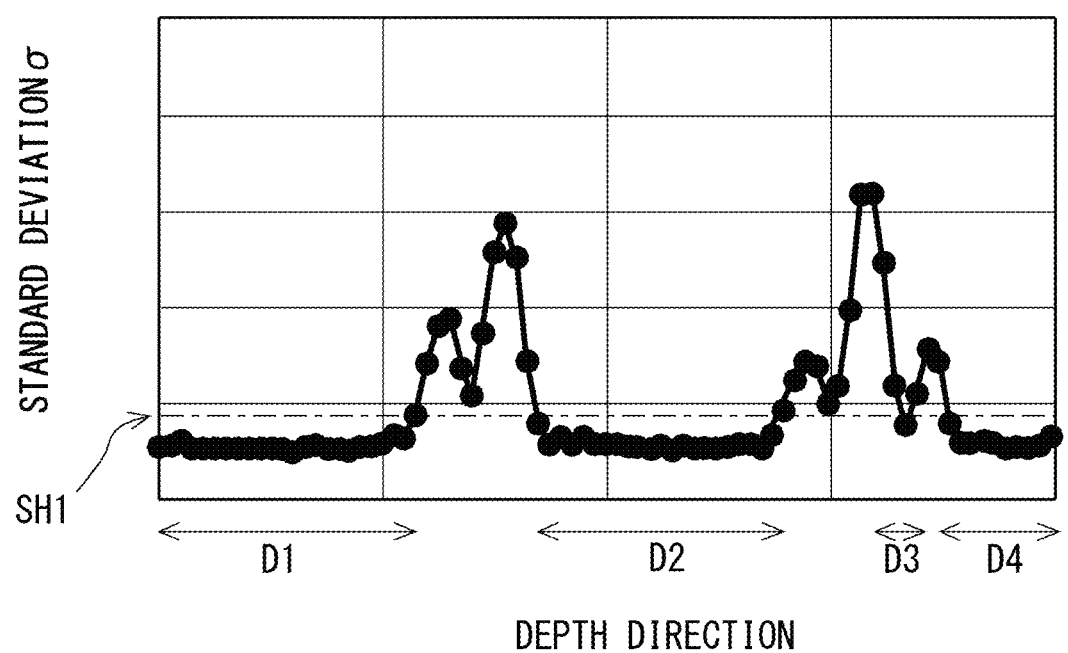
FIG. 14 is a graph showing an example of a standard deviation of luminance of an image used in the laminate state calculation method according to the embodiment, where the horizontal axis represents a depth from an inner peripheral surface of a CFRP laminate, and the vertical axis represents the standard deviation.

FIG. 14 is a graph showing an example of the standard deviation σ of the luminance of the image used in the laminate state calculation method according to the embodiment, where the horizontal axis represents the depth from an inner peripheral surface of the CFRP laminate 10 and the vertical axis represents the standard deviation σ. As shown in FIG. 14, the standard deviation σ of the luminance of the image changes with a change in the depth from the inner peripheral surface of the CFRP laminate 10.

Figure 15:
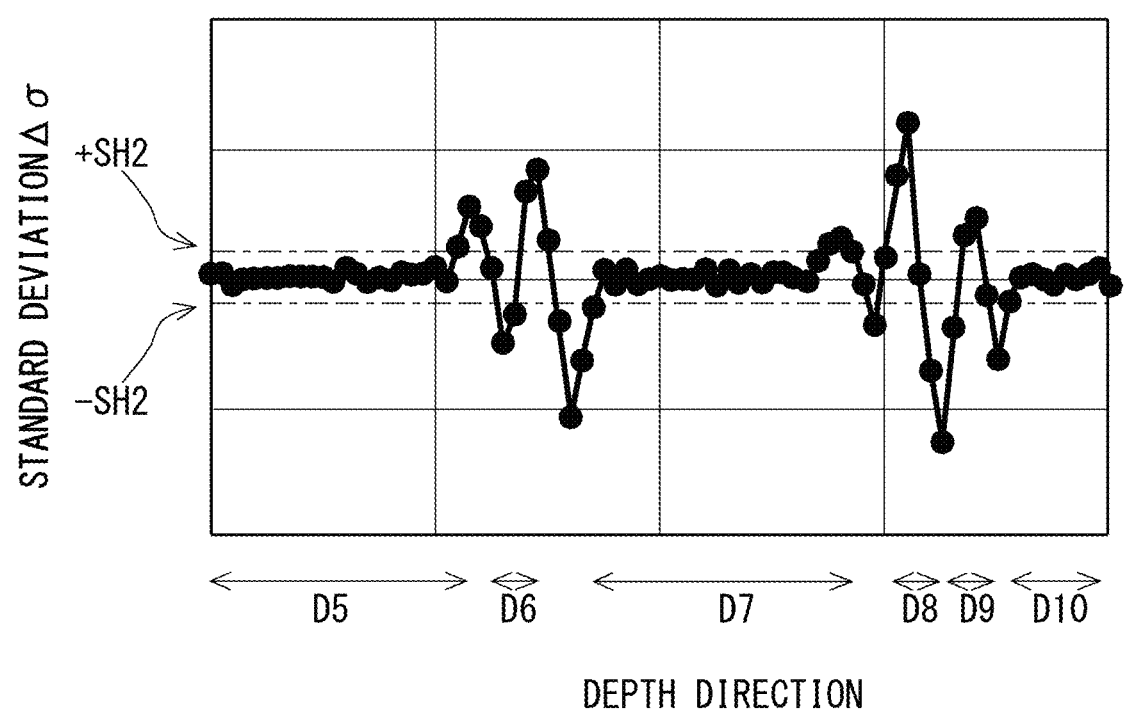
FIG. 15 is a graph showing an example of an amount of change in the standard deviation used in the laminate state calculation method according to the embodiment, where the horizontal axis represents the depth from the inner peripheral surface, and the vertical axis represents the amount of change in the standard deviation.

Next, as shown in Step S16 of FIG. 9, the acquired standard deviation σ is differentiated to obtain the amount of change in the standard deviation σ. Specifically, the image processing unit 3 differentiates the standard deviation σ calculated from the luminance of the image. Thus, the image processing unit 3 calculates the amount of change Δσ in the standard deviation σ. FIG. 15 is a graph showing an example of the amount of change Δσ in the standard deviation σ in the laminate state calculation method according to the embodiment, where the horizontal axis represents the depth from the inner peripheral surface, and the vertical axis represents the amount of change Δσ in the standard deviation σ. As shown in FIG. 15, the amount of change Δσ in the standard deviation σ varies with the change in the depth from the inner peripheral surface of the CFRP laminate 10.

Next, as shown in Step S17 of FIG. 9, the image processing unit 3 distinguishes between the first layers 11 and the second layers 12 by the standard deviation σ and a threshold of the amount of change Δσ in the standard deviation σ. The image processing unit 3 calculates the thickness of each layer from the boundary of each layer.

For example, a method for determining the laminate state using the standard deviation σ will be described. As shown in FIG. 14, a threshold SH1 of the standard deviation σ is set. Then, in the depths D1, D2, D3, and D4, the standard deviation σ is less than or equal to the threshold SH1. On the other hand, the standard deviation σ is larger than the threshold SH1 except for the depths D1, D2, D3, and D4.

Here, when the standard deviation σ≤the threshold SH1 holds, the layer is determined to be the hoop wound second layer 12, while when the standard deviation σ>the threshold SH1 holds, the layer is determined to be the helically wound first layer 11. In this example, at the depths D1, D2, D3, and D4 of the CFRP laminate 10, the layers can be determined to be the hoop wound second layers 12. The layers other than the layers at the depths D1, D2, D3, and D4 of the CFRP laminate 10 can be determined to be the helically wound first layers 11.

Next, a method of determining the laminate state using the amount of change Δσ in the standard deviation σ will be described. For example, the thresholds of the amount of change Δσ are set to (−SH2) and (+SH2). Then, at each of the depths D5 to D10, the amount of change Δσ is (−SH2) ≤Δσ≤(+SH2). On the other hand, the amount of change Δσ<(−SH2) or (+SH2)<the amount of change Δσ at the positions other than at the depths D5 to D10.

Here, when (−SH2)≤the amount of change Δσ≤(+SH2) holds, the layer is determined to be the hoop wound second layer 12, while when the amount of change Δσ<(−SH2) or (+SH2)<the amount of change Δσ holds, the layer is determined to be the helically wound first layer 11. In this example, the layers are determined to be the hoop wound second layers 12 at the depths D5 to D10 of the CFRP laminate 10. However, since the layers at the depth D6 and the like which are determined to be the hoop wound layers are present at the depth at which the layer should be determined to be the helically wound layer, it may be difficult to determine the layer as the helically wound layer only by the amount of change Δσ.

Basically, the value of the standard deviation σ is stable in the hoop wound layer. On the other hand, in the helically wound layer, the value of the standard deviation σ may be unstable. This is because the amount of change Δσ greatly changes at the boundary where the layer is switched from the helically wound layer to the hoop wound layer or from the hoop wound layer to the helically wound layer. Therefore, it is preferable that the hoop winding second layer 12 be determined by the standard deviation σ, and the determination of the helically wound first layer 11 be complemented by the amount of change Δσ.

The following equations are algorithms showing examples of the method for distinguishing between the hoop winding and the helical winding using the standard deviation σ and the amount of change Δσ in the standard deviation σ.

Assuming that a determination value of the standard deviation σ is defined as a, a=0 when the standard deviation σ is less than or equal to the threshold, whereas a=1 when the standard deviation σ is larger than the threshold. When the determination value of the amount of change Δσ is defined as b, b=0 when the amount of change Δσ falls within the range of the threshold, whereas b=1 when the amount of change Δσ falls outside the range of the threshold. When the equation (1) holds, the layer is determined to be the hoop wound layer. When the equation (2) holds, the layer is determined to be the helically wound layer.

$$a+b \leq 0 \quad (1)$$

$$a+b \geq 1 \quad (2)$$

According to the equation (1), when both the determination using the standard deviation σ and the determination using the amount of change Δσ indicate the hoop winding, the layer is determined to be the hoop wound layer. According to the equation (2), when at least one of the determination using the standard deviation σ and the determination using the amount of change Δσ indicates the helical winding, the layer is determined to be the helically wound layer.

In this embodiment, as described above, a parameter that is correlated with the quantity of voids formed in the first layers 11 and the second layers 12 is calculated from the plurality of acquired images, and the first layer 11 and the second layer 12 are distinguished from each other using the calculated parameter. When the voids extending in the first direction are defined as being the first voids and the voids extending in the second direction are defined as being the second voids, the parameter may be the standard deviation σ of the luminance of the area including the first voids in the plurality of images or the amount of change Δσ in the standard deviation σ of the luminance. For example, the first voids extend in the helical direction, and the second voids extend in the hoop direction.

Next, the effect of this embodiment will be described. In the laminate state calculation method according to this embodiment, the orientation direction of the carbon fibers is determined using the parameter that is correlated with the quantity of voids. In this way, a resolution sufficient to confirm the orientation of the carbon fibers is not required. Thus, the laminate state of the CFRP laminate 10 can be easily determined at a low cost.

Since the imaging unit 2 uses X-rays, the laminate state can be determined nondestructively. Further, by removing the influence of the voids extending in the hoop direction H2, the laminate state is determined by the parameter correlated with the voids extending in the helical direction H1. Since the determination of the laminate state can be made by one of the parameter correlated with the voids extending in the helical direction H1 and the parameter correlated with the voids extending in the hoop direction H2, the accuracy of the determination of the laminate state can be improved. Furthermore, when the quantity of the voids extending in the helical direction H1 is larger than the quantity of the voids extending in the hoop direction H2, it is possible to determine the laminate state using the parameter correlated with the quantity of voids extending in the helical direction H1 and vice versa. Thus, the accuracy of determination of the laminate state can be further improved.

Although this embodiment has been described above, the present disclosure is not limited to the above embodiment, and may be modified as appropriate without departing from the spirit and scope of the disclosure. The following laminate state calculation program for causing a computer to execute the laminate state calculation method according to this embodiment is also within the scope of the technical idea of this embodiment.

That is, the laminate state calculation program for a carbon fiber reinforced plastic laminate causes a computer to execute:

acquiring a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated; and calculating a parameter correlated with a quantity of voids formed in the first layers and the second layers from the plurality of acquired images, and distinguishing between the first layers and the second layers using the calculated parameter.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for calculating a laminate state of a carbon fiber reinforced plastic laminate, the method comprising:

acquiring a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated;

calculating a parameter correlated with a quantity of voids formed in the first layers and the second layers from the plurality of acquired images, and distinguishing between the first layers and the second layers using the calculated parameter; and removing an influence of second voids from an area including first voids in the plurality of acquired images when the voids extending in the first direction are defined as being the first voids and the voids extending in the second direction are defined as being the second voids, wherein the parameter is a standard deviation of or an amount of change in the standard deviation of luminance of an area including the first voids in the plurality of images, the laminate has a cylindrical shape including a central axis, the lamination direction is a direction orthogonal to the central axis, the second direction is a direction of rotation about the central axis, and the first direction is a direction inclined in the second direction.

2. The method according to claim 1, wherein the removing of the influence of the second voids comprises:

converting the image into a power spectrum by Fast Fourier Transform;

removing a spectrum of the second voids from the converted power spectrum; and converting the power spectrum from which the spectrum of the second voids is removed into the image by Inverse Fast Fourier Transform.

3. A laminate state calculation apparatus for a carbon fiber reinforced plastic laminate comprising:

an imaging unit configured to acquire a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated; and an image processing unit configured to:

calculate a parameter correlated with a quantity of voids formed in the first layers and the second layers from the plurality of acquired images, and distinguish between the first layers and the second layers using the calculated parameter, and remove an influence of second voids from an area including first voids in the plurality of acquired images when the voids extending in the first direction are defined as being the first voids and the voids extending in the second direction are defined as being the second voids, wherein the parameter is a standard deviation of or an amount of change in the standard deviation of luminance of an area including the first voids in the plurality of images, the laminate has a cylindrical shape including a central axis, the lamination direction is a direction orthogonal to the central axis, the second direction is a direction of rotation about the central axis, and the first direction is a direction inclined in the second direction.

4. The laminate state calculation apparatus according to claim 3, wherein the image processing unit is configured to, when the image processing unit removes the influence of the second voids:

convert the image into a power spectrum by Fast Fourier Transform;

remove a spectrum of the second voids from the converted power spectrum; and convert the power spectrum from which the spectrum of the second voids is removed into the image by Inverse Fast Fourier Transform.

5. A non-transitory computer readable medium storing a laminate state calculation program for a carbon fiber reinforced plastic laminate, the laminate state calculation program causing a computer to execute:

acquiring a plurality of images of a cross section of the laminate orthogonal to a lamination direction by imaging the laminate with X-rays at a plurality of different positions in the lamination direction, the laminate comprising first layers including carbon fibers oriented in a first direction orthogonal to the lamination direction and second layers including carbon fibers oriented in a second direction orthogonal to the lamination direction and different from the first direction, the first layers and the second layers being alternately laminated;

calculating a parameter correlated with a quantity of voids formed in the first layers and the second layers from the plurality of acquired images, and distinguishing between the first layers and the second layers using the calculated parameter; and removing an influence of second voids from an area including first voids in the plurality of acquired images when the voids extending in the first direction are defined as being the first voids and the voids extending in the second direction are defined as being the second voids, wherein the parameter is a standard deviation of or an amount of change in the standard deviation of luminance of an area including the first voids in the plurality of images, the laminate has a cylindrical shape including a central axis, the lamination direction is a direction orthogonal to the central axis, and the first direction is a direction inclined in the second direction.

6. The non-transitory computer readable medium storing the laminate state calculation program for a carbon fiber reinforced plastic laminate according to claim 5 wherein when the computer is caused to remove the influence of the second voids, the computer is further caused to execute:

converting the image into a power spectrum by Fast Fourier Transform;

removing a spectrum of the second voids from the converted power spectrum; and converting the power spectrum from which the spectrum of the second voids is removed into the image by Inverse Fast Fourier Transform.

* * * * *